Dec. 2, 1930.                    H. R. COOK                    1,783,409
               COMBINED CONDUIT CLAMPING AND BUSHING DEVICE
                          Filed Feb. 23, 1929
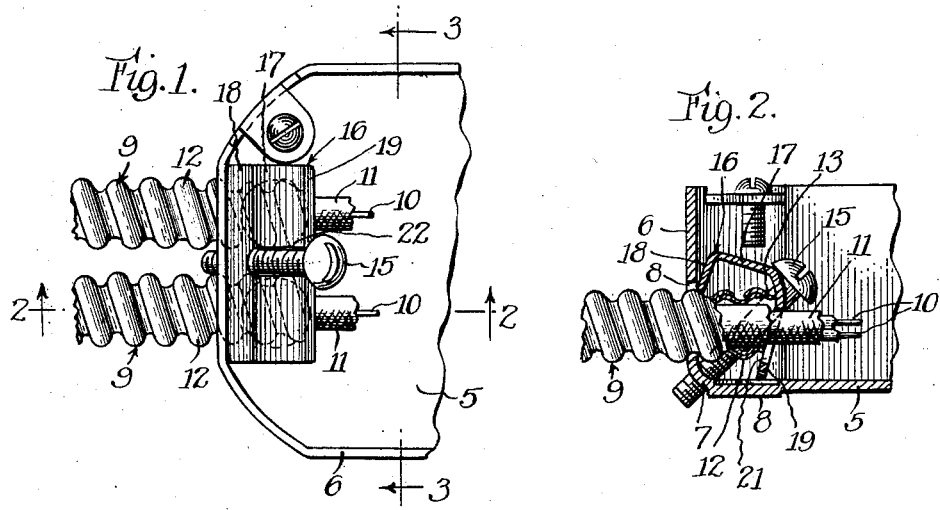
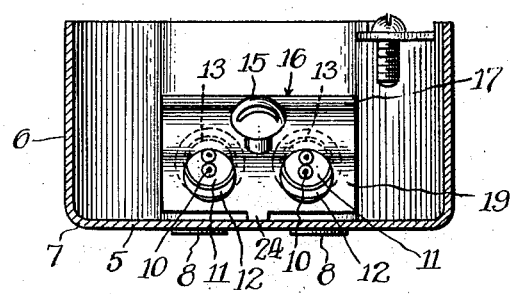
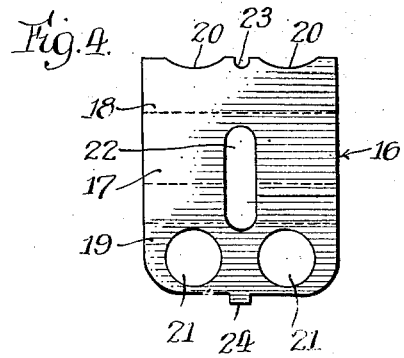
Inventor:
Herbert Ruy Cook,
By Chindahl, Parker & Carlson
Attys.

Patented Dec. 2, 1930

1,783,409

UNITED STATES PATENT OFFICE

HERBERT RAY COOK, OF CHICAGO, ILLINOIS, ASSIGNOR TO JEFFERSON ELECTRIC COMPANY, OF CHICAGO, ILLINOIS, A CORPORATION OF ILLINOIS

COMBINED CONDUIT CLAMPING AND BUSHING DEVICE

Application filed February 23, 1929. Serial No. 342,122.

The invention relates generally to outlet boxes and more specifically to boxes of this character embodying means for clamping conduits entering the sides of the box and for bushing the ends of such conduits to prevent tearing of the insulation on the wires by the sharp edges of the conduit armor.

The primary object of the present invention is to simplify the manufacture and assembly of such outlet boxes by providing a unitary device for clamping and bushing the ends of a pair of conduits, which device may be economically produced and may be mounted within the box by a single easily performed operation.

Another object is to provide an outlet box having such a clamping and bushing device operable without removing any part of the device from the box to clamp and bush a pair of cables entering the box through similarly positioned knock-out holes in either of two intersecting walls of the box.

Another object is to provide an outlet box having a clamping and bushing member formed from a single sheet of metal and adapted to be held in position and to be operated by a single screw to clamp a pair of cables entering the box through either of two intersecting walls.

Another object is to provide a new and improved device of this character having one member formed from a single piece of sheet metal with a cable-engaging portion at one edge, a bushing portion at the other edge substantially parallel to the cable-engaging portion, and a second member in the form of a screw extending through an aperture in the first member and disposed at an angle of substantially 45° to said cable-engaging and bushing portions for supporting the first member within the box and for moving and applying clamping force to the cable-engaging portion.

Another object is to provide an outlet box having a conduit clamping and bushing member initially mounted in the box by a screw occupying a position substantially bisecting the angle between the side and base walls of the box, said member extending substantially parallel to the intersection of the two walls and having an aperture formed substantially centrally thereof through which the screw extends leaving its head exposed within the box and readily accessible for operation through the open side of the box, said member having a web extending from said screw toward one wall of the box with a clamping flange at the edge of the web extending toward the other wall, and a bushing portion having spaced bushing apertures therein and extending from the screw toward and into contact with the other wall to act as a bearing for the clamping member against said other wall so that when the screw is tightened the clamping member will be caused to pivot about its point of contact with said other wall.

Another object is to provide an outlet box of this character having a combined conduit clamping and bushing device mounted therein and operable to engage and clamp a conduit at a point adjacent the wall through which it projects and having a portion arranged to be positioned in the proper relation to bush the ends of such a conduit, said device being arranged to permit free transverse movement of that portion of the conduit lying between the point of clamping and the end thereof so as to insure an effective bushing of the conduit by the device.

Other objects and advantages will become apparent from the following description taken in connection with the accompanying drawings, in which:

Figure 1 is a fragmental view looking into the open side of an outlet box embodying the preferred form of the invention and showing a pair of conduits clamped in the box.

Fig. 2 is a fragmental sectional view taken along the line 2—2 of Fig. 1.

Fig. 3 is a fragmental sectional view taken along the line 3—3 of Fig. 1 looking in the direction of the arrows.

Fig. 4 shows a development of one of the members of the clamping and bushing device.

While I have shown in the accompanying drawings and will herein describe in detail the preferred embodiment of the invention, it is to be understood that this disclosure is given for the purpose of illustrating the invention and represents but one specific manner of carrying out the invention. It is not intended as a limitation of the invention to the construction disclosed. In the appended claims, I aim to cover all modifications and alternative constructions falling within the scope of the invention as limited by the state of the prior art.

In the form chosen for disclosure herein, the invention is embodied in an outlet box having a base wall 5 and upstanding side walls 6 substantially at right angles to the base wall and intersecting therewith at 7. A pair of knock-out holes 8 is formed in the side wall 6 and another pair is formed in the base wall 5 to provide optional inlets for a pair of cables or conduits each of which is designated by the numeral 9. These cables or conduits as herein illustrated are of the type in which a pair of wires 10 having insulation 11 thereabout extend through a flexible tubular conduit 12 which serves as armor to protect the wires and the insulation.

The ends of a pair of these conduits 9 with the wires 10 are inserted through one of the pairs of knock-out holes 8, in this case through the holes in the side wall 6, so that the wires will be accessible within the box for connection to a switch or to other wires as desired. In cutting off the conduit armor 12 to permit the wires 10 in the insulation 11 to extend beyond the conduit, sharp cutting edges 13 are left exposed on the end of the conduit armor and to prevent these edges from destroying the insulation 11 and short circuiting the wires 10 it is desirable to provide means for bushing the ends of the conduit. It is also desirable to provide clamping means within the box for securing the conduits 9 in the desired relation to the box and in order to effect economy in manufacture, assembly and in the use of boxes of this character, the invention contemplates the provision of a unitary device for clamping and bushing the ends of such conduits which extend into the box through the pair of knock-out holes in either of two intersecting walls of the box.

In the preferred form illustrated herein, this unitary clamping and bushing device comprises two members one of which constitutes a screw 15 engaging the box at the intersection 7 of the base and side walls 5 and 6 and occupying the position substantially bisecting the angle between these two walls so that the head of the screw faces outwardly toward the open face of the box in a convenient position for operation. The other member of the device provides the means for engaging the conduits in a clamping operation and also provides means for bushing the ends of the conduits clamped thereby. This member is held in position and operated by the screw 15 and is preferably of such a character that it may be formed by stamping from a single sheet of sheet metal and in the form herein illustrated it comprises a member 16 which requires a substantially rectangular sheet metal blank as will be seen in Fig. 4.

This member 16 is bent into substantially U-shaped cross section as is best illustrated in Fig. 2 so as to have a web portion 17 with a flange 18 extending from one edge at substantially right angles to the web and a second flange 19 extending in the same direction from the other edge of the web. The first flange 18 as herein illustrated serves as the clamping or cable engaging portion of the member 16 and is therefore of less length than the flange 19 and has spaced semi-circular notches 20 formed in its edges to conform roughly with the sides of a pair of conduits for preventing transverse displacement of such conduits when they are clamped thereby.

The second flange 19 serves as the bushing portion of the member 16 and for this purpose a pair of spaced apertures 21 are formed therein so that when the flange 19 is positioned in abutting relation to the end edges 13 of the armor 12 of a pair of conduits, the wires 10 and their insulation 11 will extend through the apertures 21 in this flange or bushing portion of the member and will bear against the smooth edges of the apertures rather than against the sharp edges of the conduit armor which would damage the insulation. A central aperture 22 is formed in the member 16 through which the screw 15 may extend and in the present instance this aperture is elongated so as to permit the device to be easily manipulated when it is placed in position within the box.

To assemble the box, the member 16 is placed on the screw 15 and the screw is threaded into position in the box. In this position the member 16 extends substantially parallel to the intersection 7 of the side and base walls and the clamping flange 18 extends down over the knock-out holes 8 in one of the walls while the bushing flange 19 extends from its point of contact with the screw 15 toward and into contact with the other of the walls so that when it is desired to insert a pair of conduits through the knock-out holes partially covered by said clamping flange 18, it is necessary to rotate the member 16 about an axis perpendicular to the screw 15 and substantially parallel to the intersection 7. The conduits 9 are then inserted through the knock-out holes 8 and the wires 10 with their insulation 11 are inserted through the bushing apertures 21 in the bushing flange 19 and as the conduits are moved on into the box the ends of the conduit armor 13 engage the bushing flange 19 and move the entire clamping and bushing member 16 until it contacts the head of the screw 15. During this movement of the member 16 the member is maintained in its proper position on the screw through the cooperation of the aperture 22 and a notch 23 formed in the clamping flange 18 midway between the two notches 20, this notch serving to engage the side of the screw 15 in certain positions of the member 16.

The screw 15 is then tightened and in this operation the edge of the bushing flange 19 which contacts the wall of the box is pressed into firm contact with the wall and serves as a pivot point about which the member may rotate. As the screw 15 is further tightened, the entire member 16 will swing about this point and thus move the clamping flange 18 along the wall through which the conduits extend to clamp the conduits between the clamping flange 18 and the opposite edges of the knock-out holes. In its clamping position the flange 18 lies adjacent to the wall through which the conduits extend and serves to close the knock-out holes more completely about the conduits.

In order to insure an equal clamping action on each of the conduits a narrow projecting lip 24 is formed on the lower edge of the bushing flange 19 for the purpose of providing a bearing against the wall of the box about which the member 16 may pivot in any direction and thus produce an equalized clamping action on the two conduits. Thus it will be noted that the bushing flange 19 serves as means cooperating with one wall of the box and with the screw 15 when it is tightened to cause clamping movement of the clamping flange 18 along the other one of the walls.

It will be noted that the clamping flange 18 engages and clamps the conduits at a point which lies a substantial distance from the end of the conduit armor 12 so that the portion of the conduit lying between this point and the end of the conduit armor may be freely moved transversely of the axis of the conduit. Thus it will be apparent that in case a sharp edge 13 of the conduit is positioned in alinement with one of the bushing apertures 21 this sharp edge cannot cause damage to the insulation 11 when the wires 10 are moved transversely since such transverse movement of the wires will effect transverse movement of the end of the conduit until the wire 10 or its insulation 11 bears against the smooth edge of the bushing aperture 21.

It will also be noted that since the clamping and bushing member 16 is mounted within the box on the screw 15 which is substantially symmetrical with respect to the two intersecting walls and their knock-out holes, this clamping and bushing member in the form herein illustrated may be rotated through 180° about the axis of the screw 15 so that it will serve with equal facility for clamping and bushing the ends of a pair of conduits entering through the pair of knock-out holes in either the side wall or the base wall.

From the foregoing it will be apparent that the invention provides an outlet box which may be more economically manufactured and assembled than those heretofore avilable since it embodies a single sheet metal member which serves both for clamping and bushing the ends of a pair of cables and which may be utilized with equal facility for operating upon a pair of conduits extending into the box through either of two intersecting walls.

I claim as my invention:

1. An outlet box having, in combination, a base wall and an intersecting side wall, each of said walls having a pair of knock-out holes formed therein adjacent to their intersection and to each other, and a unitary device positioned within said box for clamping a pair of conduits entering the box through either of said pairs of knock-out holes and for bushing the ends of such a pair of conduits, said device comprising a substantially rigid member extending parallel to said intersection and formed from sheet metal to provide an apertured web with a clamping flange at one edge and a bushing flange at the other edge, said flanges being substantially parallel to each other, said clamping flange having spaced notches formed at its edges to engage the sides of a pair of conduits and said bushing flange having spaced apertures formed therein through which wires may pass from said conduits into the center of the box, and a screw for holding said member in said box and for applying clamping pressure to said clamping flange, said screw extending through the aperture in said web and engaging said box at an angle of substantially 45° to said walls.

2. An outlet box having, in combination, intersecting side and bottom walls, said bottom wall having a pair of adjacent knock-out holes formed therein adjacent to the intersection of said walls, and a unitary device positioned within said box for clamping and bushing the ends of a pair of conduits entering the box through said knock-out holes, said device comprising an apertured substantially rigid member extending parallel to said intersection, a screw for holding said member in said box and for applying clamping pressure to the same, said screw extending through the aperture in said member and engaging said box at an angle of substantially 45° to the walls thereof so as to substantially bisect the angle between said walls, said member being formed to provide a bushing portion extending from said screw toward and into contact with said side wall, a second portion extending from said screw substantially at right angles to said bushing section toward the said bottom wall and having a clamping flange thereon adjacent said bottom wall with spaced notches formed at the edges of said flange to engage the sides of a pair of conduits, said bushing flange having similarly spaced apertures formed therein through which wires may pass from said conduits into said box, said clamping flange extending over the holes in said bottom wall so as to necessitate rotative movement about an axis perpendicular to said screw when a pair of conduits is inserted through said holes and being rotatable in a reverse direction by said screw to clamp such a pair of conduits.

3. An outlet box having, in combination, a base wall and an intersecting side wall, each of said walls having a pair of adjacent knock-out holes formed therein adjacent to the intersection of said walls, and a unitary device positioned within said box for clamping and bushing the ends of a pair of conduits entering the box through said knock-out holes, said device comprising an apertured substantially rigid member extending parallel to said intersection, a screw for holding said member in said box and for applying clamping pressure to the same, said screw extending through the aperture in said member and occupying a position substantially bisecting the angle between the walls thereof, said member being formed to provide a bushing portion extending from said screw toward and into contact with one of said walls, a second portion extending from said screw substantially at right angles to said bushing section toward the other of said walls and having a clamping flange thereon adjacent said other wall with spaced notches formed at the edges of said flange to engage the sides of a pair of conduits, said bushing flange having similarly spaced apertures formed therein through which wires may pass from said conduits into the center of the box, said clamping flange normally extending over the holes in said other wall so as to necessitate rotative movement about an axis perpendicular to said screw when a pair of conduits is inserted through said holes, and said member being rotatable about the axis of said screw when it is loosened to position the member for clamping and bushing a pair of conduits entering either set of knock-out holes.

4. An outlet box having, in combination, two walls intersecting at substantially right angles, each of said walls having a pair of knock-out holes formed therein adjacent their intersection, a screw engaging said walls and occupying a position within said box substantially bisecting the angle between said walls, and a member held in position within said box by said screw, said member having means for engaging a pair of conduits extending into the box through either set of knock-out holes and also having means for bushing the ends of such a pair of conduits, said conduit-engaging means being arranged to be moved by said screw along the wall through which the conduits extend to clamp such conduits in position while the bushing means is clamped firmly in contact with the other of said walls.

5. An outlet box having, in combination, two walls intersecting at substantially right angles, each of said walls having a pair of knock-out holes formed therein adjacent their intersection, a screw engaging said walls and occupying a position within the box substantially bisecting the angle between said walls, and a member held in position within said box by said screw, said member having means for engaging a pair of conduits extending into the box through either set of knock-out holes and also having means for bushing the ends of such a pair of conduits.

6. An outlet box having, in combination, a pair of intersecting walls, each of said walls having a knock-out hole formed therein, and a unitary conduit clamping and bushing device comprising a screw engaging said box at the intersection of said walls and occupying a position substantially bisecting the angle therebetween, and a substantially rigid member mounted on said screw and provided with a bushing portion having an aperture through which wires may extend from an armored conduit into the center of the box, and means on said member operable when said member is moved in one direction by said screw to clamp such a conduit at a substantial distance from the end thereof and from said bushing portion so as to permit free transverse movement of the end of the conduit armor by the wires, said member being rotatable about the axis of said screw when loosened to adjust said member for clamping and bushing a conduit extending into said box through either knock-out hole.

7. An outlet box having, in combination, a pair of intersecting walls, one of said walls having a pair of knock-out holes formed therein adjacent said intersection, a screw engaging said box at an acute angle to one of said walls, and a member positioned within said box and having an aperture therein through which said screw extends to support the member within the box, said member having a conduit engaging flange thereon with a notch formed therein arranged to cooperate with the side of said screw to maintain the member in proper position within the box.

8. An outlet box having, in combination, a pair of intersecting walls, each of said walls having a knock-out hole formed therein adjacent their intersection, and a unitary device for clamping and bushing the ends of a conduit extending into the box through the knock-out hole in either of said walls, said device comprising a screw engaging said walls at their intersection and occupying a position within the box substantially bisecting the angle between said walls, and a second member loosely mounted on said screw to permit reversal of its position within the box, said member being formed from sheet metal to have substantially a U-shaped cross section, one side of said U being shorter than the other and serving as a conduit engaging and clamping portion, and the other side having an aperture formed therein through which a wire may extend into the center of the box, the smooth sides of said aperture serving as a bearing for the wire to prevent damage to its insulation.

9. An outlet box comprising, in combination, a pair of intersecting walls each of said walls having a pair of knock-out holes formed therein adjacent their intersection, a screw engaging said walls at their intersection and occupying a position substantially bisecting the angle between said walls, and a member having conduit engaging means mounted within said box and having an aperture formed therein through which said screw extends to maintain said member in position within the box, said member being freely movable about the axis of said screw to place said conduit engaging means in position to engage and clamp a pair of conduits extending into the box through the knock-out holes in either of said walls, said member having means formed integrally therewith and arranged to cooperate with one of said walls and with said screw when it is tightened to cause clamping movement of said conduit engaging means.

10. An outlet box having, in combination, a pair of intersecting walls, each of said walls having a pair of knock-out holes formed therein adjacent to their intersection and to each other, a screw engaging said walls at their intersection and occupying a position substantially bisecting an angle between the walls, and a sheet metal member positioned within said box and having an aperture formed therein through which a screw extends to support the member within the box, conduit engaging means formed on said member at one edge thereof, means formed at the opposite edge of said member for bushing the ends of a pair of conduits clamped by said member, a lip projecting from the edge of said bushing member to provide a pivotal bearing against one of the walls of said box, said member being shiftable about the pivot point formed by said lip as said screw is tightened to apply an equalized clamping pressure through the medium of said conduit engaging means to a pair of conduits extending into the box through the other one of said walls.

11. An outlet box comprising, in combination, a pair of intersecting walls, one of said walls having a pair of knock-out holes therein adjacent their intersection, a screw engaging said walls and occupying a position in which it substantially bisects the angle between the walls, a member positioned within the box having an aperture formed therein through which said screw extends to support the member in said box, said member having conduit engaging means thereon normally positioned adjacent the wall having said knock-out holes therein, said member also having means formed thereon arranged to cooperate with the other one of said walls and with the screw when it is tightened to cause an equalized clamping of a pair of conduits extending into said box through said knock-out holes.

12. The combination of a forwardly opening outlet box formed by side and rear walls intersecting substantially at right angles to each other, said box having a pair of adjacent knock-out holes formed therein with their forward edges lying in one of said side walls, a screw symmetrically positioned relatively to said two holes and engaging said box so as to occupy a position substantially bisecting the angle between said rear wall and the last mentioned side wall, and a sheet metal clamping and bushing member on said screw of substantially U-shaped cross section, one side of said U-member being engaged by said screw and having a pair of spaced bushing apertures therein through which wires may extend from a pair of conduits into the box, the other side of said U-member being formed to provide spaced notches to engage a pair of conduits extending through said pair of holes, said screw being operable to hold said other side of the U-member snugly against said side wall and to move it along said side wall to clamp a pair of conduits extending into said box through said holes.

In testimony whereof, I have hereunto affixed my signature.

HERBERT RAY COOK.